US008914290B2

(12) United States Patent
Hendrickson et al.

(10) Patent No.: US 8,914,290 B2
(45) Date of Patent: Dec. 16, 2014

(54) SYSTEMS AND METHODS FOR DYNAMICALLY IMPROVING USER INTELLIGIBILITY OF SYNTHESIZED SPEECH IN A WORK ENVIRONMENT

(75) Inventors: James Hendrickson, Ben Avon, PA (US); Debra Drylie Scott, North Huntingdon, PA (US); Duane Littleton, New Kensington, PA (US); John Pecorari, Monroeville, PA (US); Arkadiusz Slusarczyk, Glogoczow (PL)

(73) Assignee: Vocollect, Inc., Pittsburgh, PA (US)

( * ) Notice: Subject to any disclaimer, the term of this patent is extended or adjusted under 35 U.S.C. 154(b) by 393 days.

(21) Appl. No.: 13/474,921

(22) Filed: May 18, 2012

(65) Prior Publication Data

US 2012/0296654 A1 Nov. 22, 2012

Related U.S. Application Data

(60) Provisional application No. 61/488,587, filed on May 20, 2011.

(51) Int. Cl.

| | |
|---|---|
| ***G10L 13/08*** | (2013.01) |
| ***G10L 13/00*** | (2006.01) |
| ***G10L 15/20*** | (2006.01) |
| ***G10L 21/02*** | (2013.01) |
| ***G10L 21/00*** | (2013.01) |
| ***G10L 19/14*** | (2006.01) |
| ***G10L 17/00*** | (2013.01) |
| ***G10L 15/04*** | (2013.01) |

(52) U.S. Cl.
CPC .................................... *G01L 13/033* (2013.01)
USPC ........... 704/260; 704/258; 704/233; 704/243; 704/226; 704/201; 704/205; 704/246; 704/247; 704/251; 704/252

(58) Field of Classification Search
USPC ......... 704/260, 258, 233, 243, 226, 201, 205, 704/246, 247, 251, 252
See application file for complete search history.

(56) References Cited

U.S. PATENT DOCUMENTS 4,882,757 A 11/1989 Fisher et al.
4,928,302 A 5/1990 Kaneuchi et al.

(Continued)

FOREIGN PATENT DOCUMENTS

EP 0867857 A2 9/1998
EP 0905677 A1 3/1999

(Continued)

OTHER PUBLICATIONS

Smith, Ronnie W., An Evaluation of Strategies for Selective Utterance Verification for Spoken Natural Language Dialog, Proc. Fifth Conference on Applied Natural Language Processing (ANLP), 1997, 41-48.

(Continued)

*Primary Examiner* — Edgar Guerra-Erazo
(74) *Attorney, Agent, or Firm* — Additon, Higgins & Pendleton, P.A.

(57) ABSTRACT

Method and apparatus that dynamically adjusts operational parameters of a text-to-speech engine in a speech-based system. A voice engine or other application of a device provides a mechanism to alter the adjustable operational parameters of the text-to-speech engine. In response to one or more environmental conditions, the adjustable operational parameters of the text-to-speech engine are modified to increase the intelligibility of synthesized speech.

20 Claims, 5 Drawing Sheets

(56) References Cited

U.S. PATENT DOCUMENTS 4,959,864 A 9/1990 Van Nes et al.
4,977,598 A 12/1990 Doddington et al.
5,127,043 A 6/1992 Hunt et al.
5,127,055 A 6/1992 Larkey
5,230,023 A 7/1993 Nakano
5,297,194 A 3/1994 Hunt et al.
5,349,645 A 9/1994 Zhao
5,428,707 A 6/1995 Gould et al.
5,457,768 A 10/1995 Tsuboi et al.
5,465,317 A 11/1995 Epstein
5,488,652 A 1/1996 Bielby et al.
5,566,272 A 10/1996 Brems et al.
5,602,960 A 2/1997 Hon et al.
5,625,748 A 4/1997 McDonough et al.
5,640,485 A 6/1997 Ranta
5,644,680 A 7/1997 Bielby et al.
5,651,094 A 7/1997 Takagi et al.
5,684,925 A 11/1997 Morin et al.
5,710,864 A 1/1998 Juang et al.
5,717,826 A 2/1998 Setlur et al.
5,737,489 A 4/1998 Chou et al.
5,737,724 A 4/1998 Atal et al.
5,742,928 A * 4/1998 Suzuki .......................... 704/239
5,774,841 A 6/1998 Salazar et al.
5,774,858 A 6/1998 Taubkin et al.
5,797,123 A 8/1998 Chou et al.
5,799,273 A 8/1998 Mitchell et al.
5,832,430 A 11/1998 Lleida et al.
5,839,103 A 11/1998 Mammone et al.
5,842,163 A 11/1998 Weintraub
5,870,706 A 2/1999 Alshawi
5,893,057 A 4/1999 Fujimoto et al.
5,893,059 A 4/1999 Raman
5,893,902 A 4/1999 Transue et al.
5,895,447 A 4/1999 Ittycheriah et al.
5,899,972 A 5/1999 Miyazawa et al.
5,946,658 A 8/1999 Miyazawa et al.
5,960,447 A 9/1999 Holt et al.
5,970,450 A 10/1999 Hattori
6,003,002 A 12/1999 Netsch
6,006,183 A 12/1999 Lai et al.
6,073,096 A 6/2000 Gao et al.
6,076,057 A 6/2000 Narayanan et al.
6,088,669 A 7/2000 Maes
6,094,632 A 7/2000 Hattori
6,101,467 A 8/2000 Bartosik
6,122,612 A 9/2000 Goldberg
6,151,574 A 11/2000 Lee et al.
6,182,038 B1 1/2001 Balakrishnan et al.
6,192,343 B1 2/2001 Morgan et al.
6,205,426 B1 3/2001 Nguyen et al.
6,230,129 B1 5/2001 Morin et al.
6,230,138 B1 * 5/2001 Everhart ....................... 704/275
6,233,555 B1 5/2001 Parthasarathy et al.
6,233,559 B1 5/2001 Balakrishnan
6,243,713 B1 6/2001 Nelson et al.
6,246,980 B1 6/2001 Glorion et al.
6,292,782 B1 9/2001 Weideman
6,330,536 B1 12/2001 Parthasarathy et al.
6,374,212 B2 4/2002 Phillips et al.
6,374,220 B1 4/2002 Kao
6,374,221 B1 4/2002 Haimi-Cohen
6,377,662 B1 4/2002 Hunt et al.
6,377,949 B1 4/2002 Gilmour
6,397,179 B2 5/2002 Crespo et al.
6,397,180 B1 5/2002 Jaramillo et al.
6,421,640 B1 7/2002 Dolfing et al.
6,438,519 B1 8/2002 Campbell et al.
6,438,520 B1 8/2002 Curt et al.
6,487,532 B1 11/2002 Schoofs et al.
6,496,800 B1 12/2002 Kong et al.
6,505,155 B1 1/2003 Vanbuskirk et al.
6,507,816 B2 1/2003 Ortega
6,526,380 B1 2/2003 Thelen et al.
6,539,078 B1 3/2003 Hunt et al.
6,542,866 B1 4/2003 Jiang et al.
6,567,775 B1 5/2003 Maali et al.
6,571,210 B2 5/2003 Hon et al.
6,581,036 B1 6/2003 Varney, Jr.
6,587,824 B1 7/2003 Everhart et al.
6,594,629 B1 7/2003 Basu et al.
6,598,017 B1 7/2003 Yamamoto et al.
6,606,598 B1 8/2003 Holthouse et al.
6,629,072 B1 9/2003 Thelen et al.
6,675,142 B2 1/2004 Ortega et al.
6,701,293 B2 3/2004 Bennett et al.
6,725,199 B2 * 4/2004 Brittan et al. ................. 704/258
6,732,074 B1 5/2004 Kuroda
6,735,562 B1 5/2004 Zhang et al.
6,754,627 B2 6/2004 Woodward
6,766,295 B1 7/2004 Murveit et al.
6,799,162 B1 9/2004 Goronzy et al.
6,829,577 B1 * 12/2004 Gleason ........................ 704/207
6,832,224 B2 12/2004 Gilmour
6,834,265 B2 12/2004 Balasuriya
6,839,667 B2 1/2005 Reich
6,856,956 B2 2/2005 Thrasher et al.
6,868,381 B1 3/2005 Peters et al.
6,868,385 B1 * 3/2005 Gerson ......................... 704/275
6,871,177 B1 3/2005 Hovell et al.
6,876,968 B2 * 4/2005 Veprek .......................... 704/258
6,876,987 B2 4/2005 Bahler et al.
6,879,956 B1 4/2005 Honda et al.
6,882,972 B2 4/2005 Kompe et al.
6,910,012 B2 6/2005 Hartley et al.
6,917,918 B2 7/2005 Rockenbeck et al.
6,922,466 B1 7/2005 Peterson et al.
6,922,669 B2 7/2005 Schalk et al.
6,941,264 B2 9/2005 Konopka et al.
6,961,700 B2 11/2005 Mitchell et al.
6,961,702 B2 11/2005 Dobler et al.
6,985,859 B2 1/2006 Morin
6,988,068 B2 * 1/2006 Fado et al. .................... 704/225
6,999,931 B2 2/2006 Zhou
7,031,918 B2 4/2006 Hwang
7,035,800 B2 4/2006 Tapper
7,039,166 B1 5/2006 Peterson et al.
7,050,550 B2 5/2006 Steinbiss et al.
7,058,575 B2 6/2006 Zhou
7,062,435 B2 6/2006 Tzirkel-Hancock et al.
7,062,441 B1 6/2006 Townshend
7,065,488 B2 6/2006 Yajima et al.
7,069,513 B2 6/2006 Damiba
7,072,750 B2 7/2006 Pi et al.
7,072,836 B2 7/2006 Shao
7,103,542 B2 9/2006 Doyle
7,103,543 B2 9/2006 Hernandez-Abrego et al.
7,203,644 B2 4/2007 Anderson et al.
7,203,651 B2 4/2007 Baruch et al.
7,216,148 B2 5/2007 Matsunami et al.
7,225,127 B2 5/2007 Lucke
7,266,494 B2 9/2007 Droppo et al.
7,305,340 B1 * 12/2007 Rosen et al. .................. 704/258
7,319,960 B2 1/2008 Riis et al.
7,386,454 B2 6/2008 Gopinath et al.
7,392,186 B2 6/2008 Duan et al.
7,401,019 B2 7/2008 Seide et al.
7,406,413 B2 7/2008 Geppert et al.
7,430,509 B2 9/2008 Jost et al.
7,454,340 B2 11/2008 Sakai et al.
7,457,745 B2 11/2008 Kadambe et al.
7,493,258 B2 2/2009 Kibkalo et al.
7,542,907 B2 6/2009 Epstein et al.
7,565,282 B2 7/2009 Carus et al.
7,684,984 B2 3/2010 Kemp
7,813,771 B2 * 10/2010 Escott ........................ 455/569.2
7,827,032 B2 11/2010 Braho et al.
7,865,362 B2 1/2011 Braho et al.
7,895,039 B2 2/2011 Braho et al.
7,949,533 B2 5/2011 Braho et al.
7,983,912 B2 7/2011 Hirakawa et al.
8,200,495 B2 6/2012 Braho et al.
8,255,219 B2 8/2012 Braho et al.
8,374,870 B2 2/2013 Braho et al.

(56) References Cited

U.S. PATENT DOCUMENTS

| | | | | |
|---|---|---|---|---|
| 2002/0138274 | A1 | 9/2002 | Sharma et al. | |
| 2002/0143540 | A1 | 10/2002 | Malayath et al. | |
| 2002/0152071 | A1 | 10/2002 | Chaiken et al. | |
| 2002/0178004 | A1 | 11/2002 | Chang et al. | |
| 2002/0198712 | A1 | 12/2002 | Hinde et al. | |
| 2003/0023438 | A1 | 1/2003 | Schramm et al. | |
| 2003/0061049 | A1* | 3/2003 | Erten | 704/260 |
| 2003/0120486 | A1 | 6/2003 | Brittan et al. | |
| 2003/0191639 | A1 | 10/2003 | Mazza | |
| 2003/0220791 | A1 | 11/2003 | Toyama | |
| 2004/0215457 | A1 | 10/2004 | Meyer | |
| 2004/0230420 | A1* | 11/2004 | Kadambe et al. | 704/205 |
| 2005/0049873 | A1 | 3/2005 | Bartur et al. | |
| 2005/0055205 | A1 | 3/2005 | Jersak et al. | |
| 2005/0071161 | A1 | 3/2005 | Shen | |
| 2005/0080627 | A1 | 4/2005 | Hennebert et al. | |
| 2009/0192705 | A1* | 7/2009 | Golding et al. | 701/201 |
| 2010/0057465 | A1* | 3/2010 | Kirsch et al. | 704/260 |
| 2010/0250243 | A1* | 9/2010 | Schalk et al. | 704/201 |
| 2011/0029312 | A1 | 2/2011 | Braho et al. | |
| 2011/0029313 | A1 | 2/2011 | Braho et al. | |
| 2011/0093269 | A1 | 4/2011 | Braho et al. | |

FOREIGN PATENT DOCUMENTS

| | | | |
|---|---|---|---|
| EP | 1011094 | A1 | 6/2000 |
| EP | 1377000 | A1 | 1/2004 |
| JP | 63179398 | A | 7/1988 |
| JP | 64004798 | | 9/1989 |
| JP | 04296799 | A | 10/1992 |
| JP | 6059828 | A | 4/1994 |
| JP | 6130985 | A | 5/1994 |
| JP | 6161489 | A | 6/1994 |
| JP | 07013591 | A | 1/1995 |
| JP | 07199985 | A | 8/1995 |
| JP | 11175096 | A | 2/1999 |
| JP | 2000181482 | A | 6/2000 |
| JP | 2001042886 | A | 2/2001 |
| JP | 2001343992 | A | 12/2001 |
| JP | 2001343994 | A | 12/2001 |
| JP | 2002328696 | A | 11/2002 |
| JP | 2003177779 | A | 6/2003 |
| JP | 2004126413 | A | 4/2004 |
| JP | 2004334228 | A | 11/2004 |
| JP | 2005173157 | A | 6/2005 |
| JP | 2005331882 | A | 12/2005 |
| JP | 2006058390 | A | 3/2006 |
| WO | 0211121 | A1 | 2/2002 |
| WO | 2005119193 | A1 | 12/2005 |
| WO | 2006031752 | A2 | 3/2006 |

OTHER PUBLICATIONS

Kellner, A., et al., Strategies for Name Recognition in Automatic Directory Assistance Systems, Interactive Voice Technology for Telecommunications Applications, IVTTA '98 Proceedings, 1998 IEEE 4th Workshop, Sep. 29, 1998.

Chengyi Zheng and Yonghong Yan, "Improving Speaker Adaptation by Adjusting the Adaptation Data Set"; 2000 IEEE International Symposium on Intelligent Signal Processing and Communication Systems. Nov. 5-8, 2000.

Christensen, "Speaker Adaptation of Hidden Markov Models using Maximum Likelihood Linear Regression", Thesis, Aalborg University, Apr. 1996.

Mokbel, "Online Adaptation of HMMs to Real-Life Conditions: A Unified Framework", IEEE Trans. on Speech and Audio Processing, May 2001.

Silke Goronzy, Krzysztof Marasek, Ralf Kompe, Semi-Supervised Speaker Adaptation, in Proceedings of the Sony Research Forum 2000, vol. 1, Tokyo, Japan, 2000.

Jie Yi, Kei Miki, Takashi Yazu, Study of Speaker Independent Continuous Speech Recognition, Oki Electric Research and Development, Oki Electric Industry Co., Ltd., Apr. 1, 1995, vol. 62, No. 2, pp. 7-12.

Osamu Segawa, Kazuya Takeda, An Information Retrieval System for Telephone Dialogue in Load Dispatch Center, IEEJ Trans. EIS, Sep. 1, 2005, vol. 125, No. 9, pp. 1438-1443.

* cited by examiner

SYSTEMS AND METHODS FOR DYNAMICALLY IMPROVING USER INTELLIGIBILITY OF SYNTHESIZED SPEECH IN A WORK ENVIRONMENT

RELATED APPLICATIONS

This Application is a non-provisional Application of U.S. Provisional Patent Application No. 61/488,587, filed May 20, 2011 and entitled "SYSTEMS AND METHODS FOR DYNAMICALLY IMPROVING USER INTELLIGIBILITY OF SYNTHESIZED SPEECH IN A WORK ENVIRONMENT which application is incorporated herein by reference in its entirety.

FIELD OF THE INVENTION

Embodiments of the invention relate to speech-based systems, and in particular, to systems, methods, and program products for improving speech cognition in speech-directed or speech-assisted work environments that utilize synthesized speech.

BACKGROUND OF THE INVENTION

Speech recognition has simplified many tasks in the workplace by permitting hands-free communication with a computer as a convenient alternative to communication via conventional peripheral input/output devices. A user may enter data and commands by voice using a device having a speech recognizer. Commands, instructions, or other information may also be communicated to the user by a speech synthesizer. Generally, the synthesized speech is provided by a text-to-speech (TTS) engine. Speech recognition finds particular application in mobile computing environments in which interaction with the computer by conventional peripheral input/output devices is restricted or otherwise inconvenient.

For example, wireless wearable, portable, or otherwise mobile computer devices can provide a user performing work-related tasks with desirable computing and data-processing functions while offering the user enhanced mobility within the workplace. One example of an area in which users rely heavily on such speech-based devices is inventory management. Inventory-driven industries rely on computerized inventory management systems for performing various diverse tasks, such as food and retail product distribution, manufacturing, and quality control. An overall integrated management system typically includes a combination of a central computer system for tracking and management, and the people who use and interface with the computer system in the form of order fillers and other users. In one scenario, the users handle the manual aspects of the integrated management system under the command and control of information transmitted from the central computer system to the wireless mobile device and to the user through a speech-driven interface.

As the users process their orders and complete their assigned tasks, a bi-directional communication stream of information is exchanged over a wireless network between users wearing wireless devices and the central computer system. The central computer system thereby directs multiple users and verifies completion of their tasks. To direct the user's actions, information received by each mobile device from the central computer system is translated into speech or voice instructions for the corresponding user. Typically, to receive the voice instructions, the user wears a headset coupled with the mobile device.

The headset includes a microphone for spoken data entry and an ear speaker for audio data feedback. Speech from the user is captured by the headset and converted using speech recognition into data used by the central computer system. Similarly, instructions from the central computer or mobile device in the form of text are delivered to the user as voice prompts generated by the TTS engine and played through the headset speaker. Using such mobile devices, users may perform assigned tasks virtually hands-free so that the tasks are performed more accurately and efficiently.

An illustrative example of a set of user tasks in a speech-directed work environment may involve filling an order, such as filling a load for a particular truck scheduled to depart from a warehouse. The user may be directed to different warehouse areas (e.g., a freezer) in which they will be working to fill the order. The system vocally directs the user to particular aisles, bins, or slots in the work area to pick particular quantities of various items using the TTS engine of the mobile device. The user may then vocally confirm each location and the number of picked items, which may cause the user to receive the next task or order to be picked.

The speech synthesizer or TTS engine operating in the system or on the device translates the system messages into speech, and typically provides the user with adjustable operational parameters or settings such as audio volume, speed, and pitch. Generally, the TTS engine operational settings are set when the user or worker logs into the system, such as at the beginning of a shift. The user may walk though a number of different menus or selections to control how the TTS engine will operate during their shift. In addition to speed, pitch, and volume, the user will also generally select the TTS engine for their native tongue, such as English or Spanish, for example.

As users become more experienced with the operation of the inventory management system, they will typically increase the speech rate and/or pitch of the TTS engine. The increased speech parameters, such as increased speed, allows the user to hear and perform tasks more quickly as they gain familiarity with the prompts spoken by the application. However, there are often situations that may be encountered by the worker that hinder the intelligibility of speech from the TTS engine at the user's selected settings.

For example, the user may receive an unfamiliar prompt or enter into an area of a voice or task application that they are not familiar with. Alternatively, the user may enter a work area with a high ambient noise level or other audible distractions. All these factors degrade the user's ability to understand the TTS engine generated speech. This degradation may result in the user being unable to understand the prompt, with a corresponding increase in work errors, in user frustration, and in the amount of time necessary to complete the task.

With existing systems, it is time consuming and frustrating to be constantly navigating through the necessary menus to change the TTS engine settings in order to address such factors and changes in the work environment. Moreover, since many such factors affecting speech intelligibility are temporary, is becomes particularly time consuming and frustrating to be constantly returning to and navigating through the necessary menus to change the TTS engine back to its previous settings once the temporary environmental condition has passed.

Accordingly, there is a need for systems and methods that improve user cognition of synthesized speech in speech-directed environments by adapting to the user environment. These issues and other needs in the prior art are met by the invention as described and claimed below.

SUMMARY OF THE INVENTION

In an embodiment of the invention, a communication system for a speech-based work environment is provided that includes a text-to-speech engine having one or more adjustable operational parameters. Processing circuitry monitors an environmental condition related to intelligibility of an output of the text-to-speech engine, and modifies the one or more adjustable operational parameters of the text-to-speech engine in response to the monitored environmental condition.

In another embodiment of the invention, a method of communicating in a speech-based environment using a text-to-speech engine is provided that includes monitoring an environmental condition related to intelligibility of an output of the text-to-speech engine. The method further includes modifying one or more adjustable operational parameters of the text-to-speech engine in response to the environmental condition.

BRIEF DESCRIPTION OF THE DRAWINGS

The accompanying drawings, which are incorporated in and constitute a part of this specification, illustrate embodiments of the invention and, together with the general description of the invention given above and the detailed description of the embodiments given below, serve to explain the principles of the invention.

It should be understood that the appended drawings are not necessarily to scale, presenting a somewhat simplified representation of various features illustrative of the basic principles of embodiments of the invention. The specific design features of embodiments of the invention as disclosed herein, including, for example, specific dimensions, orientations, locations, and shapes of various illustrated components, as well as specific sequences of operations (e.g., including concurrent and/or sequential operations), will be determined in part by the particular intended application and use environment. Certain features of the illustrated embodiments may have been enlarged or distorted relative to others to facilitate visualization and provide a clear understanding.

DETAILED DESCRIPTION

Embodiments of the invention are related to methods and systems for dynamically modifying adjustable operational parameters of a text-to-speech (TTS) engine running on a device in a speech-based system. To this end, the system monitors one or more environmental conditions associated with a user that are related to or otherwise affect the user intelligibility of the speech or audible output that is generated by the TTS engine. As used herein, environmental conditions are understood to include any operating/work environment conditions or variables which are associated with the user and may affect or provide an indication of the intelligibility of generated speech or audible outputs of the TTS engine for the user. Environmental conditions associated with a user thus include, but are not limited to, user environment conditions such as ambient noise level or temperature, user tasks and speech outputs or prompts or messages associated with the tasks, system events or status, and/or user input such as voice commands or instructions issued by the user. The system may thereby detect or otherwise determine that the operational environment of a device user has certain characteristics, as reflected by monitored environmental conditions. In response to monitoring the environmental conditions or sensing of other environmental characteristics that may reduce the ability of the user to understand TTS voice prompts or other TTS audio data, the system may modify one or more adjustable operational parameters of the TTS engine to improve intelligibility. Once the system operational environment or environmental variable has returned to its original or previous state, a predetermined amount of time has passed, or a particular sensed environmental characteristic ceases or ends, the adjusted or modified operational parameters of the TTS engine may be returned to their original or previous settings. The system may thereby improve the user experience by automatically increasing the user's ability to understand critical speech or spoken data in adverse operational environments and conditions while maintaining the user's preferred settings under normal conditions.

Figure 1:
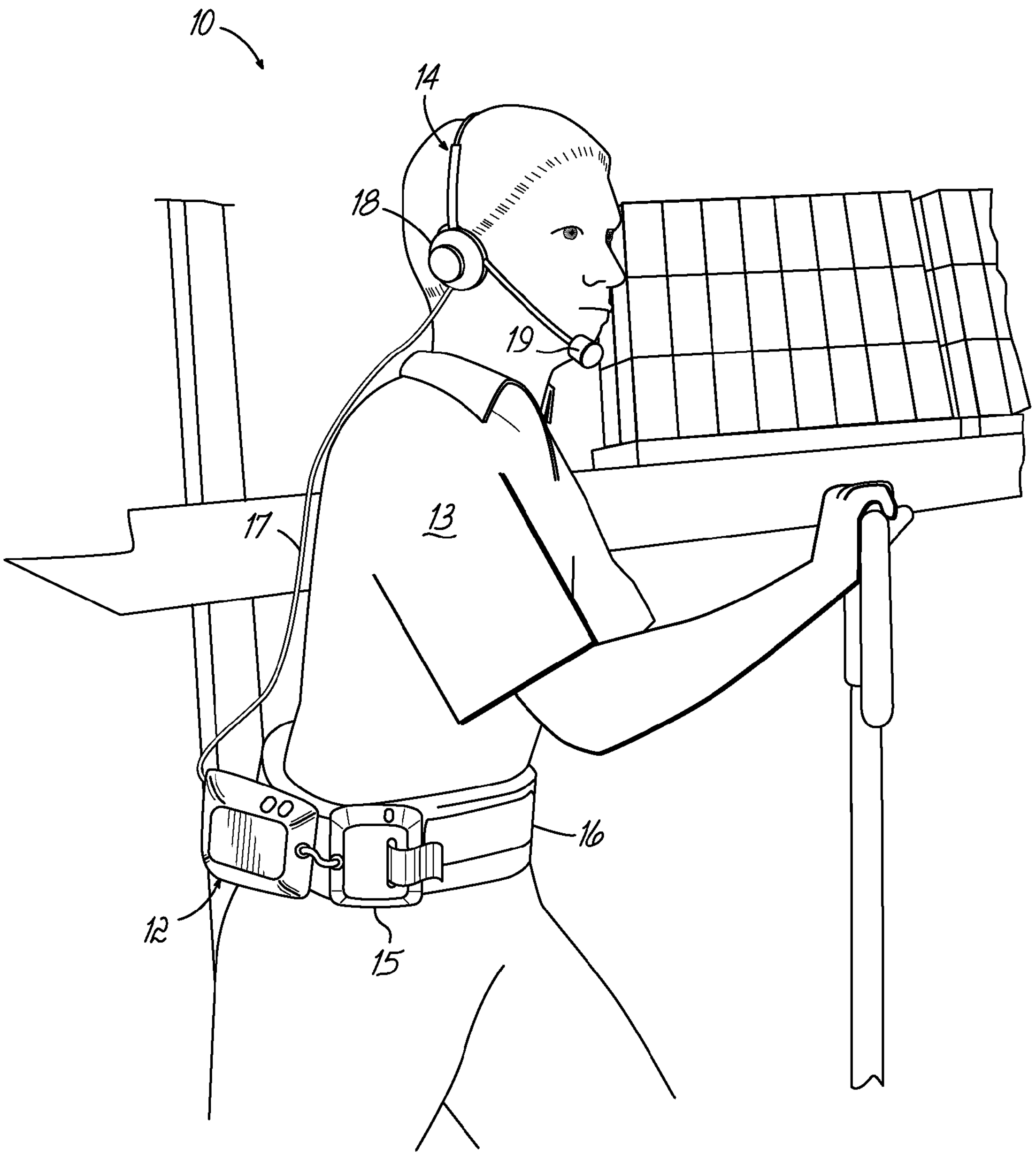
FIG. 1 is a diagrammatic illustration of a typical speech-enabled task management system showing a headset and a device being worn by a user performing a task in a speech-directed environment consistent with embodiments of the invention.

FIG. 1 is an illustration of a user in a typical speech-based system 10 consistent with embodiments of the invention. The system 10 includes a computer device or terminal 12. The device 12 may be a mobile computer device, such as a wearable or portable device that is used for mobile workers. The example embodiments described herein may refer to the device 12 as a mobile device, but the device 12 may also be a stationary computer that a user interfaces with using a mobile headset or device such as a Bluetooth® headset. Bluetooth® is an open wireless standard managed by Bluetooth SIG, Inc. of Kirkland Wash. The device 12 communicates with a user 13 through a headset 14 and may also interface with one or more additional peripheral devices 15, such as a printer or identification code reader. As illustrated, the device 12 and the peripheral device 15 are mobile devices usually worn or carried by the user 13, such as on a belt 16.

In one embodiment of the invention, device 12 may be carried or otherwise transported, such as on the user's waist or forearm, or on a lift truck, harness, or other manner of transportation. The user 13 and the device 12 communicate using speech through the headset 14, which may be coupled to the device 12 through a cable 17 or wirelessly using a suitable wireless interface. One such suitable wireless interface may be Bluetooth®. As noted above, if a wireless headset is used, the device 12 may be stationary, since the mobile worker can move around using just the mobile or wireless headset. The headset 14 includes one or more speakers 18 and one or more microphones 19. The speaker 18 is configured to play TTS audio or audible outputs (such as speech output associated with a speech dialog to instruct the user 13 to perform an action), while the microphone 19 is configured to capture speech input from the user 13 (such as a spoken user response for conversion to machine readable input). The user 13 may thereby interface with the device 12 hands-free through the headset 14 as they move through various work environments or work areas, such as a warehouse.

Figure 2:
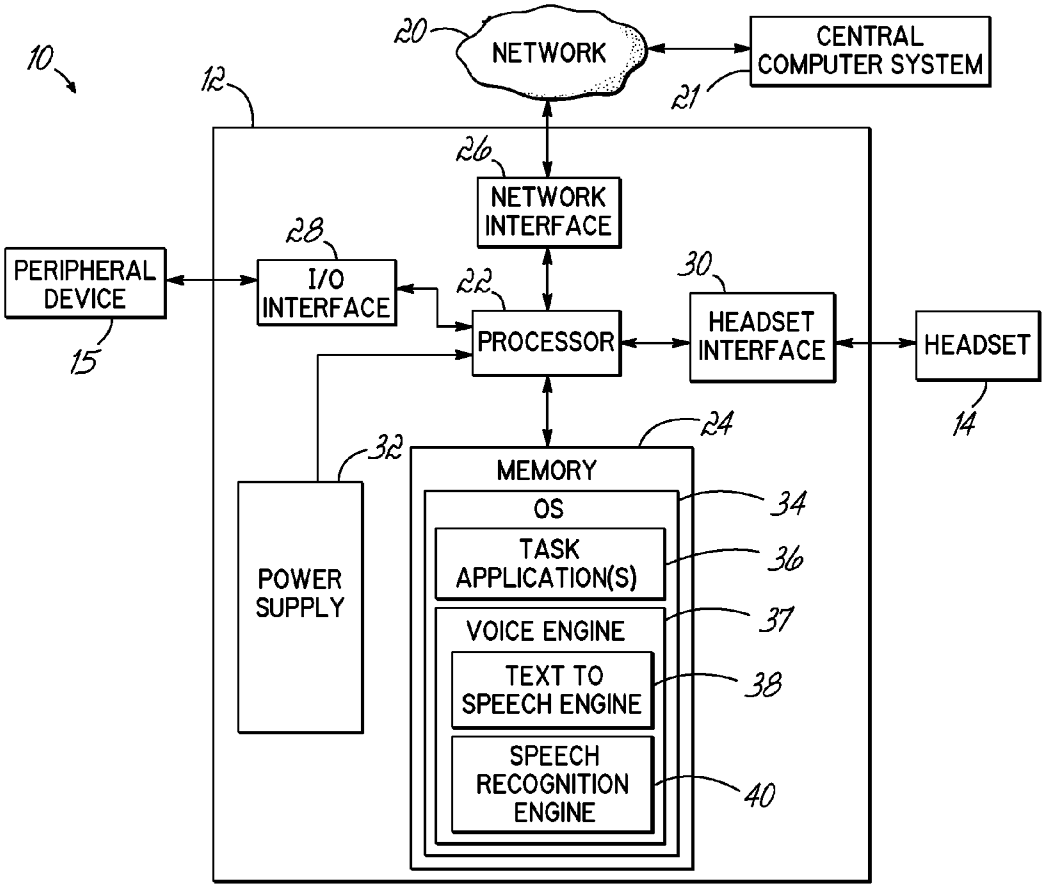
FIG. 2 is a diagrammatic illustration of hardware and software components of the task management system of FIG. 1.

FIG. 2 is a diagrammatic illustration of an exemplary speech-based system 10 as in FIG. 1 including the device 12, the headset 14, the one or more peripheral devices 15, a network 20, and a central computer system 21. The network 20 operatively connects the device 12 to the central computer system 21, which allows the central computer system 21 to download data and/or user instructions to the device 12. The link between the central computer system 21 and device 12 may be wireless, such as an IEEE 802.11 (commonly referred to as WiFi) link, or may be a cabled link. If device 12 is a mobile device and carried or worn by the user, the link with system 21 will generally be wireless. By way of example, the computer system 21 may host an inventory management program that downloads data in the form of one or more tasks to the device 12 that will be implemented through speech. For example, the data may contain information about the type, number and location of items in a warehouse for assembling a customer order. The data thereby allows the device 12 to provide the user with a series of spoken instructions or directions necessary to complete the task of assembling the order or some other task.

The device 12 includes suitable processing circuitry that may include a processor 22, a memory 24, a network interface 26, an input/output (I/O) interface 28, a headset interface 30, and a power supply 32 that includes a suitable power source, such as a battery, for example, and provides power to the electrical components comprising the device 12. As noted, device 12 may be a mobile device and various examples discussed herein refer to such a mobile device. One suitable device is a TALKMAN® terminal device available from Vocollect, Inc. of Pittsburgh, Pa. However, device 12 may be a stationary computer that the user interfaces with through a wireless headset, or may be integrated with the headset 14. The processor 22 may consist of one or more processors selected from microprocessors, micro-controllers, digital signal processors, microcomputers, central processing units, field programmable gate arrays, programmable logic devices, state machines, logic circuits, analog circuits, digital circuits, and/or any other devices that manipulate signals (analog and/or digital) based on operational instructions that are stored in memory 24.

Memory 24 may be a single memory device or a plurality of memory devices including but not limited to read-only memory (ROM), random access memory (RAM), volatile memory, non-volatile memory, static random access memory (SRAM), dynamic random access memory (DRAM), flash memory, cache memory, and/or any other device capable of storing information. Memory 24 may also include memory storage physically located elsewhere in the device 12, such as memory integrated with the processor 22.

The device 12 may be under the control and/or otherwise rely upon various software applications, components, programs, files, objects, modules, etc. (hereinafter, "program code") residing in memory 24. This program code may include an operating system 34 as well as one or more software applications including one or more task applications 36, and a voice engine 37 that includes a TTS engine 38, and a speech recognition engine 40. The applications may be configured to run on top of the operating system 34 or directly on the processor 22 as "stand-alone" applications. The one or more task applications 36 may be configured to process messages or task instructions for the user 13 by converting the task messages or task instructions into speech output or some other audible output through the voice engine 37. To facilitate synthesizing the speech output, the task application 36 may employ speech synthesis functions provided by TTS engine 38, which converts normal language text into audible speech to play to a user. For the other half of the speech-based system, the device 12 uses speech recognition engine 40 to gather speech inputs from the user and convert the speech to text or other usable system data The processing circuitry and voice engine 37 provide a mechanism to dynamically modify one or more operational parameters of the TTS engine 38. The text-to-speech engine 38 has at least one, and usually more than one, adjustable operational parameter. To this end, the voice engine 37 may operate with task applications 36 to alter the speed, pitch, volume, language, and/or any other operational parameter of the TTS engine depending on speech dialog, conditions in the operating environment, or certain other conditions or variables. For example, the voice engine 37 may reduce the speed of the TTS engine 38 in response to the user 13 asking for help or entering into an unfamiliar area of the task application 36. Other potential uses of the voice engine 37 include altering the operational parameters of the TTS engine 38 based on one or more system events or one or more environmental conditions or variables in a work environment. As will be understood by a person of ordinary skill in the art, the invention may be implemented in a number of different ways, and the specific programs, objects, or other software components for doing so are not limited specifically to the implementations illustrated.

Figure 3:
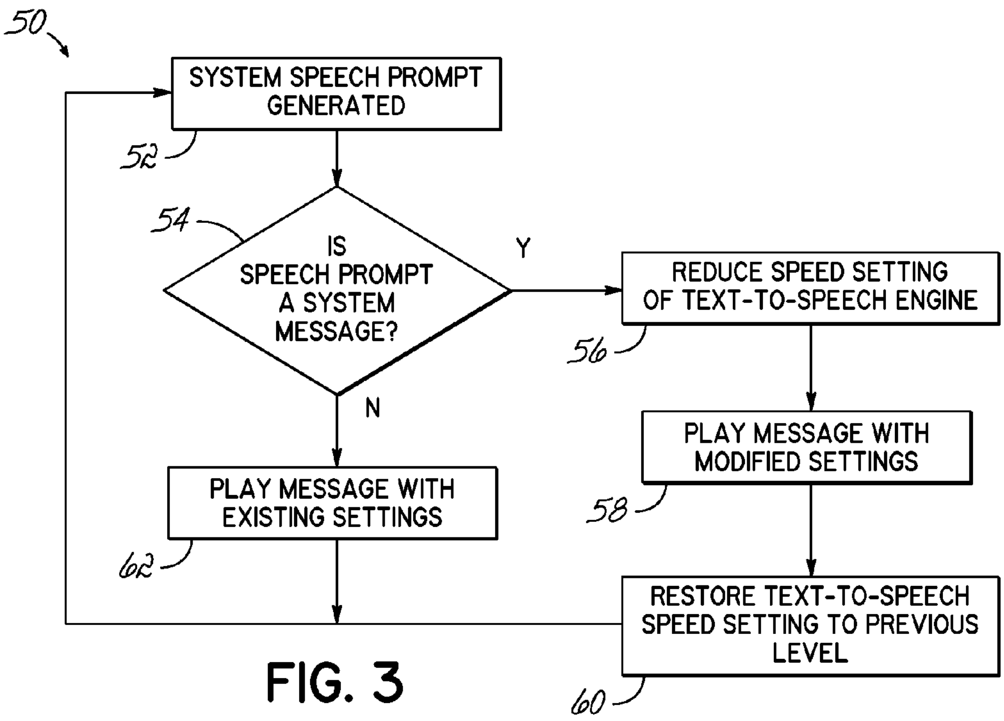
FIG. 3 is flowchart illustrating a sequence of operations that may be executed by a software component of FIG. 2 to improve the intelligibility of a system prompt message consistent with embodiments of the invention.

Referring now to FIG. 3, a flowchart 50 is presented illustrating one specific example of how the invention, through the processing circuitry and voice engine 37, may be used to dynamically improve the intelligibility of a speech prompt. The particular environmental conditions monitored are associated with a type of message or speech prompt being converted by the TTS engine 38. Specifically, the status of the speech prompt being a system message or some other important message is monitored. The message might be associated with a system event, for example. The invention adjusts TTS operational parameters accordingly. In block 52, a system speech prompt is generated or issued to a user through the device 12. If the prompt is a typical prompt and part of the ongoing speech dialog, it will be generated through the TTS engine 38 based on the user settings for the TTS engine 38. However, if the speech prompt is a system message or other high priority message, it may be desirable to make sure it is understood by the user. The current user settings of the TTS operational parameters may be such that the message would be difficult to understand. For example, the speed of the TTS engine 38 may be too fast. This is particularly so if the system message is one that is not normally part of a conventional dialog, and so somewhat unfamiliar to a user. The message may be a commonly issued message, such as a broadcast message informing the user 13 that there is product delivery at the dock; or the message may be a rarely issued message, such as message informing the user 13 of an emergency condition. Because unfamiliar messages may be less intelligible to the user 13 than a commonly heard message, the task application 36 and/or voice engine 37 may temporarily reduce the speed of the TTS engine 38 during the conversion of the unfamiliar message to improve intelligibility.

To that end, and in accordance with an embodiment of the invention, in block 54 the environmental condition of the speech prompt or message type is monitored and the speech prompt is checked to see if it is a system message or system message type. To allow this determination to be made, the message may be flagged as a system message type by the task application 36 of the device 12 or by the central computer system 21. Persons having ordinary skill in the art will understand that there are many ways by which the determination that the speech prompt is a certain type, such as a system message, may be made, and embodiments of the invention are not limited to any particular way of making this determination or of the other types of speech prompts or messages that might be monitored as part of the environmental conditions.

If the speech prompt is determined to not be a system message or some other message type ("No" branch of decision block 54), the task application 36 proceeds to block 62. In block 62, the message is played to the user 13 though the headset 14 in a normal manner according to operational parameter settings of the TTS engine 38 as set by the user. However, if the speech prompt is determined to be a system message or some other type of message ("Yes" branch of decision block 54), the task application 36 proceeds to block 56 and modifies an operational parameter for the TTS engine. In the embodiment of FIG. 3, the processing circuitry reduces the speed setting of the text-to-speech engine 38 from its current user setting. The slower spoken message may thereby be made more intelligible. Of course, the task application 36 and processing circuitry may also modify other TTS engine operational parameters, such as volume or pitch, for example. In some embodiments, the amount by which the speed setting is reduced may be varied depending on the type of message. For example, less common messages may receive a larger reduction in the speed setting. The message may be flagged as common or uncommon, native language or foreign language, as having a high importance or priority, or as a long or short message, with each type of message being played to the user 13 at a suitable speed. The task application 36 then proceeds to play the message to user 13 at the modified operational parameter settings, such as the slower speed setting. The user 13 thereby receives the message as a voice message over the headset 14 at a slower rate that may improve the intelligibility of the message.

Once the message has been played, the task application 36 proceeds to block 60, where the operational parameter (i.e., speed setting) is restored to its previous level or setting. The operational parameters of the text-to-speech engine 38 are thus returned to their normal user settings so the user can proceed as desired in the speech dialog. Usually, the speech dialog will then resume as normal. However, if further monitored conditions dictate, the modified settings might be maintained. Alternatively, the modified setting might be restored only after a certain amount of time has elapsed. Advantageously, embodiments of the invention thereby provide certain messages and message types with operational parameters modified to improve the intelligibility of the message automatically while maintaining the preferred settings of the user 13 under normal conditions for the various task applications 36.

Additional examples of environmental conditions, such as voice data or message types that may be flagged and monitored for improved intelligibility, include messages over a certain length or syllable count, messages that are in a language that is non-native to the TTS engine 38, and messages that are generated when the user 13 requests help, speaks a command, or enters an area of the task application 36 that is not commonly used, and where the user has little experience. While the environmental condition may be based on a message status, or the type of message, or language of the message, length of message, or commonality or frequency of the message, other environmental conditions are also monitored in accordance with embodiments of the invention, and may also be used to modify the operational parameters of the TTS engine 38.

Figure 4:
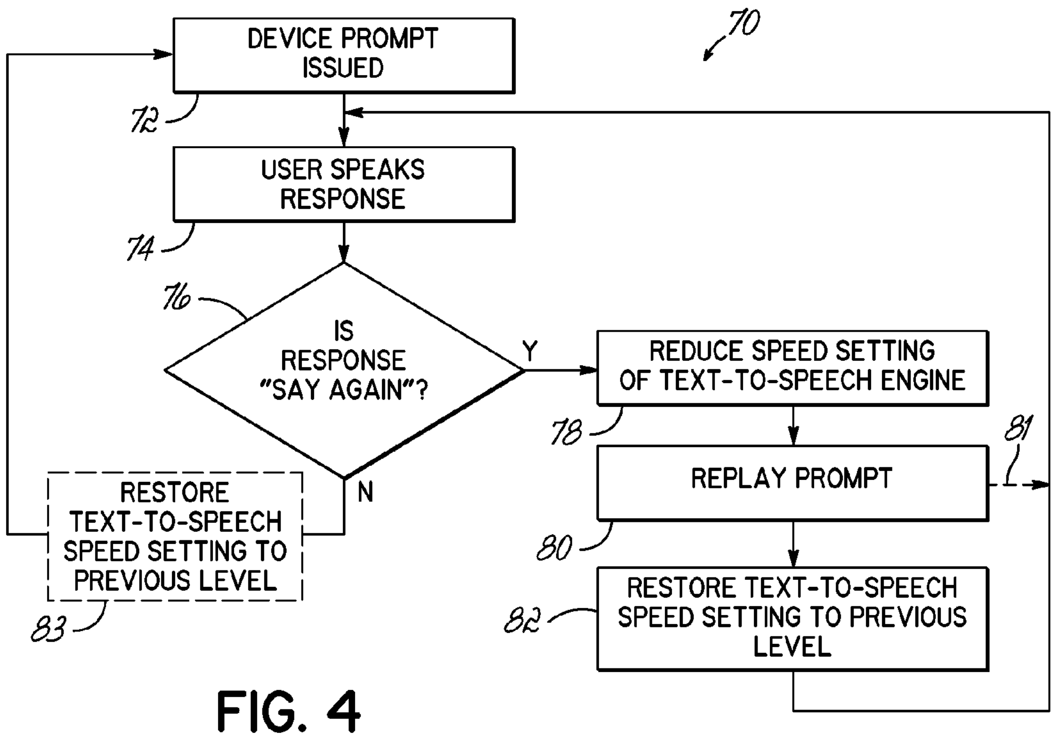
FIG. 4 is flowchart illustrating a sequence of operations that may be executed by a software component of FIG. 2 to improve the intelligibility of a repeated prompt consistent with embodiments of the invention.

Referring now to FIG. 4, flowchart 70 illustrates another specific example of how an environmental condition may be monitored to improve the intelligibility of a speech-based system message based on input from the user 13, such as a type of command from a user. Specifically, certain user speech, such as spoken commands or types of commands from the user 13, may indicate that they are experiencing difficulties in understanding the audible output or speech prompts from the TTS engine 38. In block 72, a speech prompt is issued by the task application 36 of a device (e.g., "Pick 4 Cases"). The task application 36 then proceeds to block 74 where the task application 36 waits for the user 13 to respond. If the user 13 understands the prompt, the user 13 responds by speaking into the microphone 19 with an appropriate or expected speech phrase (e.g., "4 Cases Picked"). The task application 36 then returns to block 72 ("No" branch of decision block 76), where the next speech prompt in the task is issued (e.g., "Proceed to Aisle 5").

If, on the other hand, the user 13 does not understand the speech prompt, the user 13 responds with a command type or phrase such as "Say Again". That is, the speech prompt was not understood, and the user needs it repeated. In this event, the task application 36 proceeds to block 78 ("Yes" branch of decision block 74) where the processing circuitry and task application 36 uses the mechanism provided by the processing circuitry and voice engine 37 to reduce the speed setting of the TTS engine 38. The task application 36 then proceeds to re-play the speech prompt (Block 80) before proceeding to block 82. In block 82, the modified operational parameter, such as speed setting for the TTS engine 38, may be restored to its previous pre-altered setting or original setting before returning to block 74.

As previously described, in block 74, the user 13 responds to the slower replayed speech prompt. If the user 13 understands the repeated and slowed speech prompt, the user response may be an affirmative response (e.g., "4 Cases Picked") so that the task application proceeds to block 72 and issues the next speech prompt in the task list or dialog. If the user 13 still does not understand the speech prompt, the user may repeat the phrase "Say Again", causing the task application 36 to again proceed back to block 78, where the process is repeated. Although speed is the operational parameter adjusted in the illustrated example, other operational parameters or combinations of such parameters (e.g., volume, pitch, etc.) may be modified as well.

In an alternative embodiment of the invention, the processing circuitry and task application 36 defers restoring the original setting of the modified operational parameter of the TTS engine 38 until an affirmative response is made by the user 13. For example, if the operational parameter is modified in block 78, the prompt is replayed (Block 80) at the modified setting, and the program flow proceeds by arrow 81 to await the user response (Block 74) without restoring the settings to previous levels. An alternative embodiment also incrementally reduces the speed of the TTS engine 38 each time the user 13 responds with a certain spoken command, such as "Say Again". Each pass through blocks 76 and 78 thereby further reduces the speed of the TTS engine 38 incrementally until a minimum speed setting is reached or the prompt is understood. Once the prompt is sufficiently slowed so that the user 13 understands the prompt, the user 13 may respond in an affirmative manner ("No" branch of decision block 76). The affirmative response, indicating by the environmental condition a return to a previous state (e.g., user intelligibility), causes the speed setting or other modified operational parameter settings of the TTS engine 38 to be restored to their original or previous settings (Block 83) and the next speech prompt is issued.

Advantageously, embodiments of the invention provide a dynamic modification of an operational parameter of the TTS engine 38 to improve the intelligibility of a TTS message, command, or prompt based on monitoring one or more environmental conditions associated with a user of the speech-based system. More advantageously, in one embodiment, the settings are returned to the previous preferred settings of the user 13 when the environmental condition indicates a return to a previous state, and once the message, command, or prompt has been understood without requiring any additional user action. The amount of time necessary to proceed through the various tasks may thereby be reduced as compared to systems lacking this dynamic modification feature.

While the dynamic modification may be instigated by a specific type of command from the user 13, an environmental condition based on an indication that the user 13 is entering a new or less-familiar area of a task application 36 may also be monitored and used to drive modification of an adjustable operational parameter. For example, if the task application 36 proceeds with dialog that the system has flagged as new or not commonly used by the user 13, the speed parameter of the TTS engine 38 may be reduced or some other operational parameter might be modified.

While several examples noted herein are directed to monitoring environmental conditions related to the intelligibility of the output of the TTS engine 38 that are based upon the specific speech dialog itself, or commands in a speech dialog, or spoken responses from the user 13 that are reflective of intelligibility, other embodiments of the invention are not limited to these monitored environmental conditions or variables. It is therefore understood that there are other environmental conditions directed to the physical operating or work environment of the user 13 that might be monitored rather than the actual dialog of the voice engine 37 and task applications 36. In accordance with another aspect of the invention, such external environmental conditions may also be monitored for the purposes of dynamically and temporarily modifying at least one operational parameter of the TTS engine 38.

The processing circuitry and software of the invention may also monitor one or more external environmental conditions to determine if the user 13 is likely being subjected to adverse working conditions that may affect the intelligibility of the speech from the TTS engine 38. If a determination that the user 13 is encountering such adverse working conditions is made, the voice engine 37 may dynamically override the user settings and modify those operational parameters accordingly. The processing circuitry and task application 36 and/or voice engine 37, may thereby automatically alter the operational parameters of the TTS engine 38 to increase intelligibility of the speech played to the user 13 as disclosed.

Figure 5:
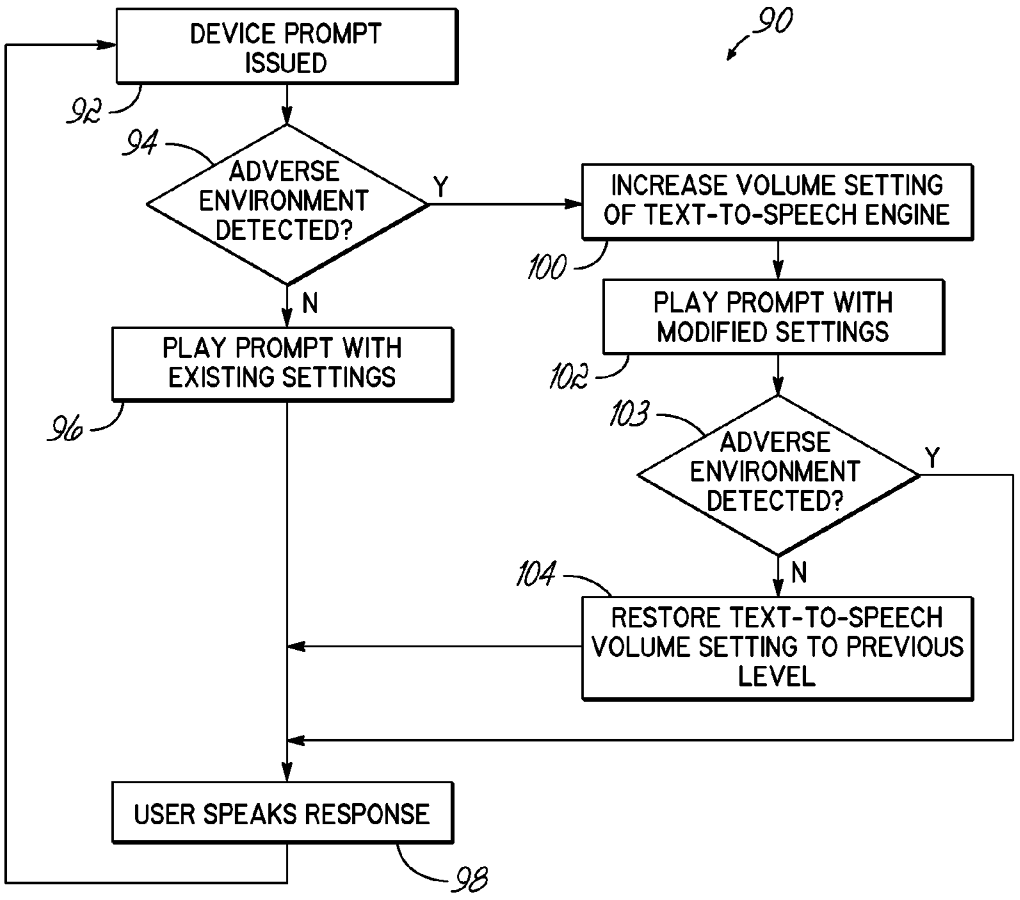
FIG. 5 is flowchart illustrating a sequence of operations that may be executed by a software component of FIG. 2 to improve the intelligibility of a prompt played in an adverse environment consistent with embodiments of the invention.

Referring now to FIG. 5, a flowchart 90 is presented illustrating one specific example of how the processing circuitry and software, such as task applications and/or voice engine 37, may be used to automatically improve the intelligibility of a voice message, command, or prompt in response to monitoring an environmental condition and a determination that the user 13 is encountering an adverse environment in the workplace. In block 92, a prompt is issued by the task application 36 (e.g., "Pick 4 Cases"). The task application 36 then proceeds to block 94. If the task application 36 makes a determination based on monitored environmental conditions that the user 13 is not working in an adverse environment ("No" branch of decision block 94), the task application 36 proceeds as normal to block 96. In block 96, the prompt is played to the user 13 using the normal or user defined operational parameters of the text-to-speech engine 38. The task application 36 then proceeds to block 98 and waits for a user response in the normal manner.

If the task application 36 makes a determination that the user 13 is in an adverse environment, such as a high ambient noise environment ("Yes" branch of decision block 94), the task application 36 proceeds to block 100. In block 100, the task application 36 and/or voice engine 37 causes the operational parameters of the text-to-speech engine 38 to be altered by, for example, increasing the volume. The task application 36 then proceeds to block 102 where the prompt is played with the modified operational parameter settings before proceeding to block 104. In block 103, a determination is again made, based on the monitored environmental condition, if it is an adverse or noisy environment. If not, and the environmental condition indicates a return to a previous state, i.e., normal noise level, the flow returns to block 104, and the operational parameter settings of the TTS engine 38 are restored to their previous pre-altered or original settings (e.g., the volume is reduced) before proceeding to block 98 where the task manager 36 waits for a user response in the normal manner. If the monitored condition indicates that the environment is still adverse, the modified operational parameter settings remain.

The adverse environment may be indicated by a number of different external factors within the work area of the user 13 and monitored environmental conditions. For example, the ambient noise in the environment may be particularly high due to the presence of noisy equipment, fans, or other factors. A user may also be working in a particularly noisy region of a warehouse. Therefore, in accordance with an embodiment of the invention, the noise level may be monitored with appropriate detectors. The noise level may relate to the intelligibility of the output of the TTS engine 38 because the user may have difficulty in hearing the output due to the ambient noise. To monitor for an adverse environment, certain sensors or detectors may be implemented in the system, such as on the headset or device 12, to monitor such an external environmental variable.

Alternatively, the system 10 and/or the mobile device 12 may provide an indication of a particular adverse environment to the processing circuitry. For example, based upon the actual tasks assigned to the user 13, the system 10 or mobile device 12 may know that the user 13 will be working in a particular environment, such as a freezer environment. Therefore, the monitored environmental condition is the location of a user for their assigned work. Fans in a freezer environment often make the environment noisier. Furthermore, mobile workers working in a freezer environment may be required to wear additional clothing, such as a hat. The user 13 may therefore be listening to the output from the TTS engine 38 through the additional clothing. As such, the system 10 may anticipate that for tasks associated with the freezer environment, an operational parameter of the TTS engine 38 may need to be temporarily modified. For example, the volume setting may need to be increased. Once the user is out of a freezer and returns to the previous state of the monitored environmental condition (i.e., ambient temperature), the operational parameter settings may be returned to a previous or unmodified setting. Other detectors might be used to monitor environmental conditions, such as a thermometer or temperature sensor to sense the temperature of the working environment to indicated the user is in a freezer.

By way of another example, system level data or a sensed condition by the mobile device 12 may indicate that multiple users are operating in the same area as the user 13, thereby adding to the overall noise level of that area. That is, the environmental condition monitored is the proximity of one user to another user. Accordingly, embodiments of the present invention contemplate monitoring one or more of these environmental conditions that relate to the intelligibility of the output of the TTS engine 38, and temporarily modifying the operational parameters of the TTS engine 38 to address the monitored condition or an adverse environment.

To make a determination that the user 13 is subject to an adverse environment, the task application 36 may look at incoming data in near real time. Based on this data, the task application 36 makes intelligent decisions on how to dynamically modify the operational parameters of the TTS engine 38. Environmental variables—or data—that may be used to determine when adverse conditions are likely to exist include high ambient or background noise levels detected at a detector, such as microphone 19. The device 12 may also determine that the user 13 is in close proximity to other users 13 (and thus subjected to higher levels of background noise or talking) by monitoring Bluetooth® signals to detect other nearby devices 12 of other users. The device 12 or headset 14 may also be configured with suitable devices or detectors to monitor an environmental condition associated with the temperature and detect a change in the ambient temperature that would indicate the user 13 has entered a freezer as noted. The processing circuitry task application 36 may also determine that the user is executing a task that requires being in a freezer as noted. In a freezer environment, as noted, the user 13 may be exposed to higher ambient noise levels from fans and may also be wearing additional clothing that would muffle the audio output of the speakers 18 of headset 14. Thus, the task application 36 may be configured to increase the volume setting of the text-to-speech engine 38 in response to the monitored environmental conditions being associated with work in a freezer.

Another monitored environmental condition might be time of day. The task application 36 may take into account the time of day in determining the likely noise levels. For example, third shift may be less noisy than first shift or certain periods of a shift.

In another embodiment of the invention, the experience level of a user might be the environmental condition that is monitored. For example, the total number of hours logged by a specific user 13 may determine the level of user experience (e.g., a less experienced user may require a slower setting in the text-to-speech engine) with a text-to-speech engine, or the level of experience with an area of a task application, or the level of experience with a specific task application. As such, the environmental condition of user experience may be checked by system 10, and used to modify the operational parameters of the TTS engine 38 for certain times or task applications 36. For example, a monitored environmental condition might include monitoring the amount of time logged by a user with a task application, part of a task application, or some other experience metric. The system 10 tracks such experience as a user works.

In accordance with another embodiment of the invention, an environmental condition, such as the number of users in a particular work space or area, may affect the operational parameters of the TTS engine 38. System level data of system 10 indicating that multiple users 13 are being sent to the same location or area may also be utilized as a monitored environmental condition to provide an indication that the user 13 is in close proximity to other users 23. Accordingly, an operational parameter such as speed or volume may be adjusted. Likewise, system data indicating that the user 13 is in a location that is known to be noisy as noted (e.g., the user responds to a prompt indicating they are in aisle 5, which is a known noisy location) may be used as a monitored environmental condition to adjust the text-to-speech operational parameters. As noted above, other location or area based information, such as if the user is making a pick in a freezer where they may be wearing a hat or other protective equipment that muffles the output of the headset speakers 18 may be a monitored environmental condition, and may also trigger the task application 36 to increase the volume setting or reduce the speed and/or pitch settings of the text-to-speech engine 38, for example.

It should be further understood that there are many other monitored environmental conditions or variables or reasons why it may be desirable to alter the operational parameters of the text-to-speech engine 38 in response to a message, command, or prompt. In one embodiment, an environmental condition that is monitored is the length of the message or prompt being converted by the text-to-speech engine. Another is the language of the message or prompt. Still another environmental condition might be the frequency that a message or prompt is used by a task application to indicate how frequently a user has dealt with the message/prompt. Additional examples of speech prompts or messages that may be flagged for improved intelligibility include messages that are over a certain length or syllable count, messages that are in a language that is non-native to the text-to-speech engine 38 or user 13, important system messages, and commands that are generated when the user 13 requests help or enters an area of the task application 36 that is not commonly used by that user so that the user may get messages that they have not heard with great frequency.

Figure 6:
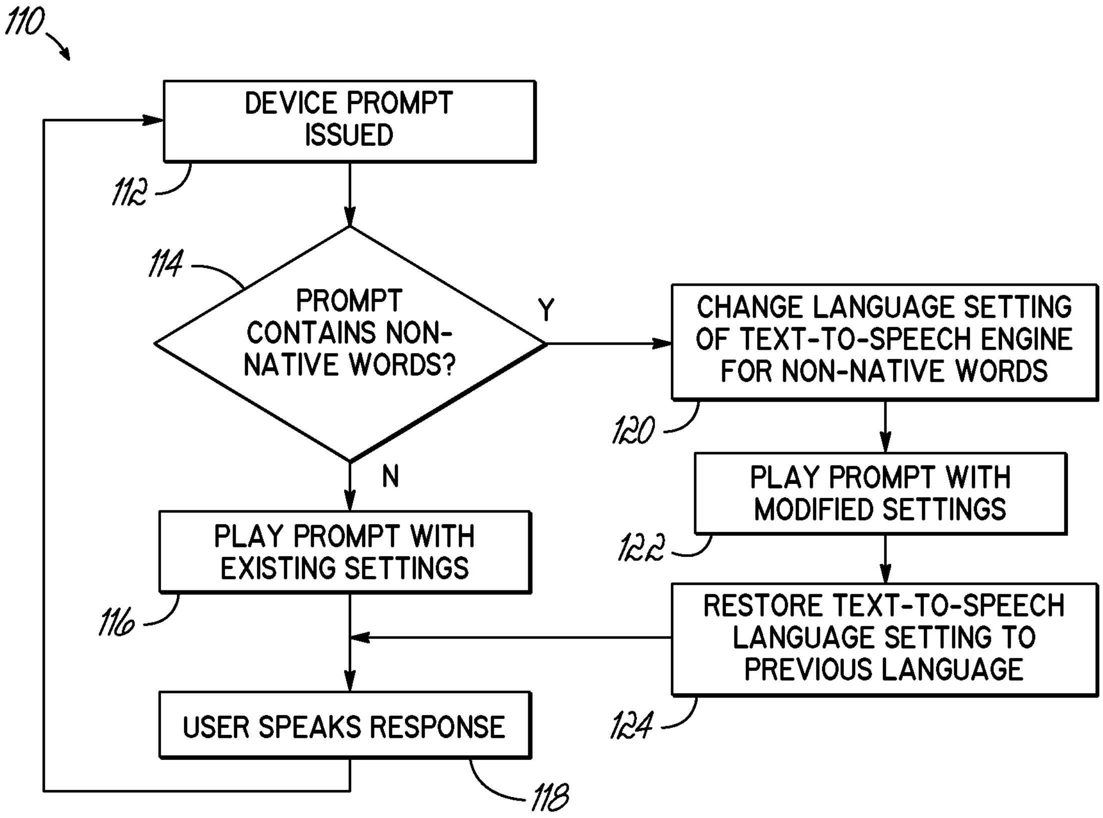
FIG. 6 is a flowchart illustrating a sequence of operations that may be executed by a software component of FIG. 2 to improve the intelligibility of a prompt that contains non-native words consistent with embodiments of the invention.

Referring now to FIG. 6, a flowchart 110 is presented illustrating another specific example of how embodiments of the invention may be used to automatically improve the intelligibility of a voice prompt in response to a determination that the prompt may be inherently difficult to understand. In block 112, a prompt or utterance is issued by the task application 36 that may contain a portion that may be difficult to understand, such as a non-native language word. The task application 36 then proceeds to block 114. If the task application 36 determines that the prompt is in the user's native language, and does not contain a non-native word ("No" branch of decision block 94), the task application 36 proceeds to block 116 where the task application 36 plays the prompt using the normal or user defined text-to-speech operational parameters. The task application 36 then proceeds to block 118, where it waits for a user response in the normal manner.

If the task application 36 makes a determination that the prompt contains a non-native word or phrase (e.g., "Boeuf Bourguignon") ("Yes" branch of decision block 114), the task application 36 proceeds to block 120. In block 120, the operational parameters of the text-to-speech engine 38 are modified to speak that section of the phrase by changing the language setting. The task application 36 then proceeds to block 122 where the prompt or section of the prompt is played using a text-to-speech engine library or database modified or optimized for the language of the non-native word or phrase. The task application 36 then proceeds to block 124. In block 124, the language setting of the text-to-speech engine 38 is restored to its previous or pre-altered setting (e.g., changed from French back to English) before proceeding to block 98 where the task manager 36 waits for a user response in the normal manner.

Figure 7:
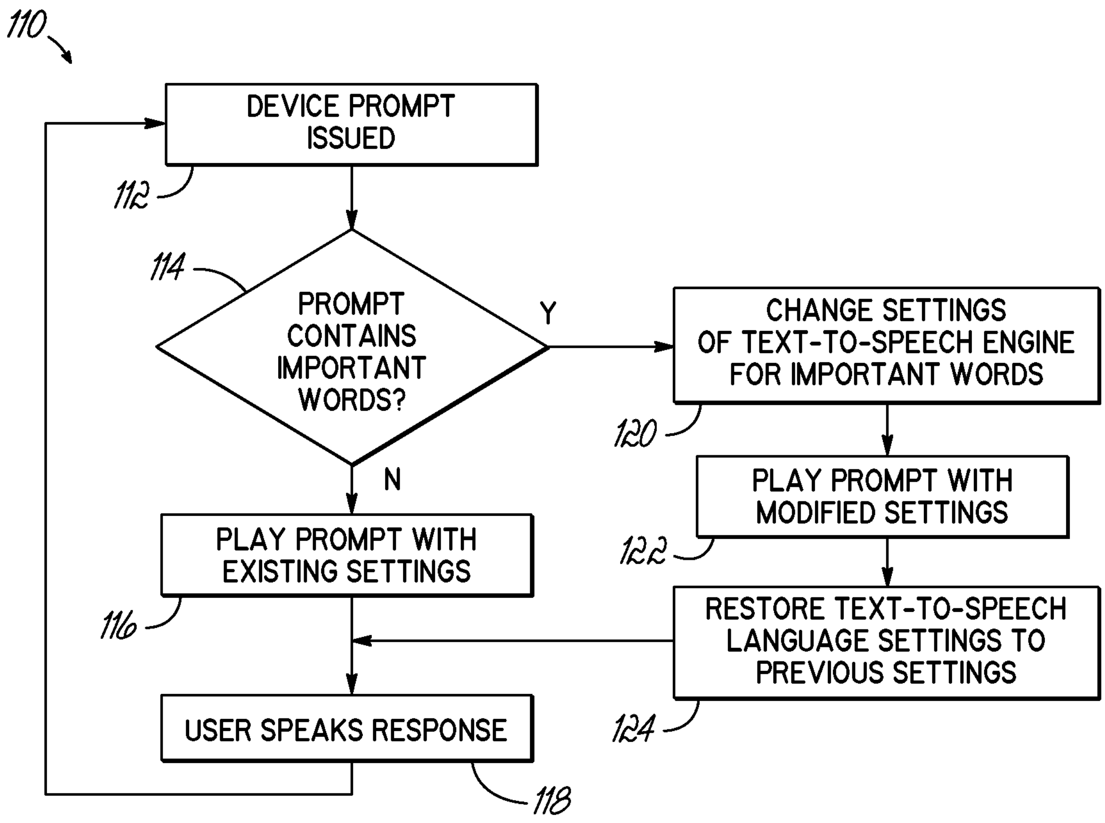
FIG. 7 is a flowchart illustrating a sequence of operations that may be executed by a software component of FIG. 2 to improve the intelligibility of a prompt that contains non-native words consistent with embodiments of the invention.

In some cases, the monitored environmental condition may be a part or section of the speech prompt or utterance that may be unintelligible or difficult to understand with the user selected TTS operational settings for some other reason than the language. A portion may also need to be emphasized because the portion is important. When this occurs, the operational settings of the TTS engine 38 may only require adjustment during playback of a single word or subset of the speech prompt. To this end, the task application 36 may check to see if a portion of the phrase is to be emphasized. So, as illustrated in FIG. 7 (similar to FIG. 6) in block 114, the inquiry may be directed to a prompt containing words or sections of importance or for special emphasis. The dynamic TTS modification is then applied on a word-by-word basis to allow flagged words or subsections of a speech prompt to be played back with altered TTS engine operational settings. That is, the voice engine 37 provides a mechanism whereby the operational parameters of the TTS engine 38 may be altered by the task application 36 for individual spoken words and phrases within a speech prompt. The operational parameters of the TTS engine 38 may thereby be altered to improve the intelligibility of only the words within the speech prompt that need enhancement or emphasis.

The present invention and voice engine 37 may thereby improve the user experience by allowing the processing circuitry and task applications 36 to dynamically adjust text-to-speech operational parameters in response to specific monitored environmental conditions or variables, including working conditions, system events, and user input. The intelligibility of critical spoken data may thereby be improved in the context in which it is given. The invention thus provides a powerful tool that allows task application developers to use system and context aware environmental conditions and variables within speech-based tasks to set or modify text-to-speech operational parameters and characteristics. These modified text-to-speech operational parameters and characteristics may dynamically optimize the user experience while still allowing the user to select their original or preferable TTS operational parameters.

A person having ordinary skill in the art will recognize that the environments and specific examples illustrated in FIGS. 1-7 are not intended to limit the scope of embodiments of the invention. In particular, the speech-based system 10, device 12, and/or the central computer system 21 may include fewer or additional components, or alternative configurations, consistent with alternative embodiments of the invention. As another example, the device 12 and headset 14 may be configured to communicate wirelessly. As yet another example, the device 12 and headset 14 may be integrated into a single, self-contained unit that may be worn by the user 13.

Furthermore, while specific operational parameters are noted with respect to the monitored environmental conditions and variables of the examples herein, other operational parameters may also be modified as necessary to increase intelligibility of the output of a TTS engine. For example, operational parameters, such as pitch or speed, may also be adjusted when volume is adjusted. Or, if the speed has slowed down, the volume may be raised. Accordingly, the present invention is not limited to the number of parameters that may be modified or the specific ways in which the operational parameters of the TTS engine may be modified temporarily based on monitored environmental conditions.

Thus, a person having skill in the art will recognize that other alternative hardware and/or software environments may be used without departing from the scope of the invention. For example, a person having ordinary skill in the art will appreciate that the device 12 may include more or fewer applications disposed therein. Furthermore, as noted, the device 12 could be a mobile device or stationary device as long at the user can be mobile and still interface with the device. As such, other alternative hardware and software environments may be used without departing from the scope of embodiments of the invention. Still further, the functions and steps described with respect to the task application 36 may be performed by or distributed among other applications, such as voice engine 37, text-to-speech engine 38, speech recognition engine 40, and/or other applications not shown. Moreover, a person having ordinary skill in the art will appreciate that the terminology used to describe various pieces of data, task messages, task instructions, voice dialogs, speech output, speech input, and machine readable input are merely used for purposes of differentiation and are not intended to be limiting.

The routines executed to implement the embodiments of the invention, whether implemented as part of an operating system or a specific application, component, program, object, module or sequence of instructions executed by one or more computing systems are referred to herein as a "sequence of operations", a "program product", or, more simply, "program code". The program code typically comprises one or more instructions that are resident at various times in various memory and storage devices in a computing system (e.g., the device 12 and/or central computer 21), and that, when read and executed by one or more processors of the computing system, cause that computing system to perform the steps necessary to execute steps, elements, and/or blocks embodying the various aspects of embodiments of the invention.

While embodiments of the invention have been described in the context of fully functioning computing systems, those skilled in the art will appreciate that the various embodiments of the invention are capable of being distributed as a program product in a variety of forms, and that the invention applies equally regardless of the particular type of computer readable media or other form used to actually carry out the distribution. Examples of computer readable media include but are not limited to physical and tangible recordable type media such as volatile and nonvolatile memory devices, floppy and other removable disks, hard disk drives, optical disks (e.g., CD-ROM's, DVD's, Blu-Ray disks, etc.), among others. Other forms might include remote hosted services, cloud based offerings, software-as-a-service (SAS) and other forms of distribution.

While the present invention has been illustrated by a description of the various embodiments and the examples, and while these embodiments have been described in considerable detail, it is not the intention of the applicants to restrict or in any way limit the scope of the appended claims to such detail. Additional advantages and modifications will readily appear to those skilled in the art.

As such, the invention in its broader aspects is therefore not limited to the specific details, apparatuses, and methods shown and described herein. A person having ordinary skill in the art will appreciate that any of the blocks of the above flowcharts may be deleted, augmented, made to be simultaneous with another, combined, looped, or be otherwise altered in accordance with the principles of the embodiments of the invention. Accordingly, departures may be made from such details without departing from the scope of applicants' general inventive concept.

What is claimed is:

1. A communication system for a speech-based environment, the communication system comprising:

a text-to-speech engine configured for providing an audible output to a user, the text-to-speech engine including at least one adjustable operational parameter; and processing circuitry configured to monitor at least one environmental condition associated with the user that is related to intelligibility of an audible output of the text-to-speech engine, the processing circuitry further configured to modify the at least one adjustable operational parameter of the text-to-speech engine in response to the monitored at least one environmental condition.

2. The communication system of claim 1 wherein the processing circuitry restores the modified adjustable operational parameter of the text-to-speech engine to a previous setting in response to the environmental condition indicating a return to a previous state.

3. The communication system of claim 2 wherein the at least one adjustable operational parameter of the text-to-speech engine that is modified includes at least one of speed, pitch, volume, and language.

4. The communication system of claim 1 wherein the processing circuitry varies the modification amount of the at least one adjustable operational parameter incrementally.

5. The communication system of claim 1 wherein the monitored environmental condition related to intelligibility of the audible output of the text-to-speech engine is associated with at least one of: an ambient noise level, a type of message being converted by the text-to-speech engine, a type of command received from a user, a location of a user, a proximity of a user to a another user, an ambient temperature of a user's environment, a time of day, an experience level of a user with the text-to-speech engine, an experience level of a user with an area of a task application, an amount of time logged by a user with the task application, a language of a message being converted by the text-to-speech engine, a length of a message being converted by the text-to-speech engine, a frequency that a message being converted by the text-to-speech engine is used by the task application.

6. The communication system of claim 5 wherein the processing circuitry is configured to monitor at least one environmental condition associated with a proximity of a user to a another user by detecting the presence of a wireless signal transmitted by a device of the another user.

7. The communication system of claim 1 wherein the processing circuitry is configured to monitor at least one environmental condition associated with the user by monitoring a task performed by the user.

8. The communication system of claim 5 wherein the message being converted by the text-to-speech engine includes a flag indicating the type of message being converted.

9. The communication system of claim 1 further comprising at least one detector operable for monitoring an environmental condition related to intelligibility of the audible output of the text-to-speech engine.

10. The communication system of claim 9 wherein the detector is configured for monitoring at least one of temperature or noise.

11. The communication system of claim 1 wherein the processing circuitry monitors at least one environmental condition associated with the user that is related to intelligibility of an audible output of the text-to-speech engine by detecting a spoken command indicating the user is experiencing difficulties understanding the audible output of the text-to-speech engine.

12. A method of communicating in a speech-based environment using a text-to-speech engine, the method comprising:

monitoring at least one environmental condition associated with a user that is related to intelligibility of an audible output of the text-to-speech engine by the user; and modifying at least one adjustable operational parameter of the text-to-speech engine in response to the monitored at least one environmental condition to improve the intelligibility of an audible output of the text-to-speech engine.

13. The method of claim 12 further comprising restoring the modified adjustable operational parameter of the text-to-speech engine to a previous setting in response to the environmental condition indicating a return to a previous state.

14. The method of claim 12 wherein the at least one adjustable operational parameter of the text-to-speech engine modified includes at least one of speed, pitch, volume, and language.

15. The method of claim 12 further comprising varying the modification amount of the at least one adjustable operational parameter incrementally.

16. The method of claim 12 further comprising monitoring at least one environmental condition related to intelligibility of the audible output of the text-to-speech engine that is associated with at least one of: an ambient noise level, a type of message being converted by the text-to-speech engine, a type of command received from a user, a location of a user, a proximity of a user to a another user, an ambient temperature of a user's environment, a time of day, an experience level of a user with the text-to-speech engine, an experience level of a user with an area of a task application, an amount of time logged by a user with the task application, a language of a message being converted by the text-to-speech engine, a length of a message being converted by the text-to-speech engine, a frequency that a message being converted by the text-to-speech engine is used by the task application.

17. The method of claim 12 further comprising monitoring at least one environmental condition associated with the user by monitoring a task performed by the user.

18. The method of claim 12 further comprising monitoring an environmental condition related to intelligibility of the audible output of the text-to-speech engine using a detector for detecting at least one of temperature or noise.

19. The method of claim 12 further comprising monitoring at least one environmental condition associated with the user by detecting a spoken command indicating the user is experiencing difficulties understanding an audible output of the text-to-speech engine.

20. The method of claim 16 further comprising monitoring at least one environmental condition related to intelligibility of the audible output of the text-to-speech engine by evaluating a flag indicating a type of message being converted.

* * * * *